Sept. 5, 1939.   C. S. BALLARD   2,171,736
ART OF MAKING DENTURES
Filed March 29, 1935   3 Sheets-Sheet 1

Inventor
Charles S. Ballard
By Charles L. Reynolds
Attorney

Sept. 5, 1939.   C. S. BALLARD   2,171,736
ART OF MAKING DENTURES
Filed March 29, 1935   3 Sheets-Sheet 2
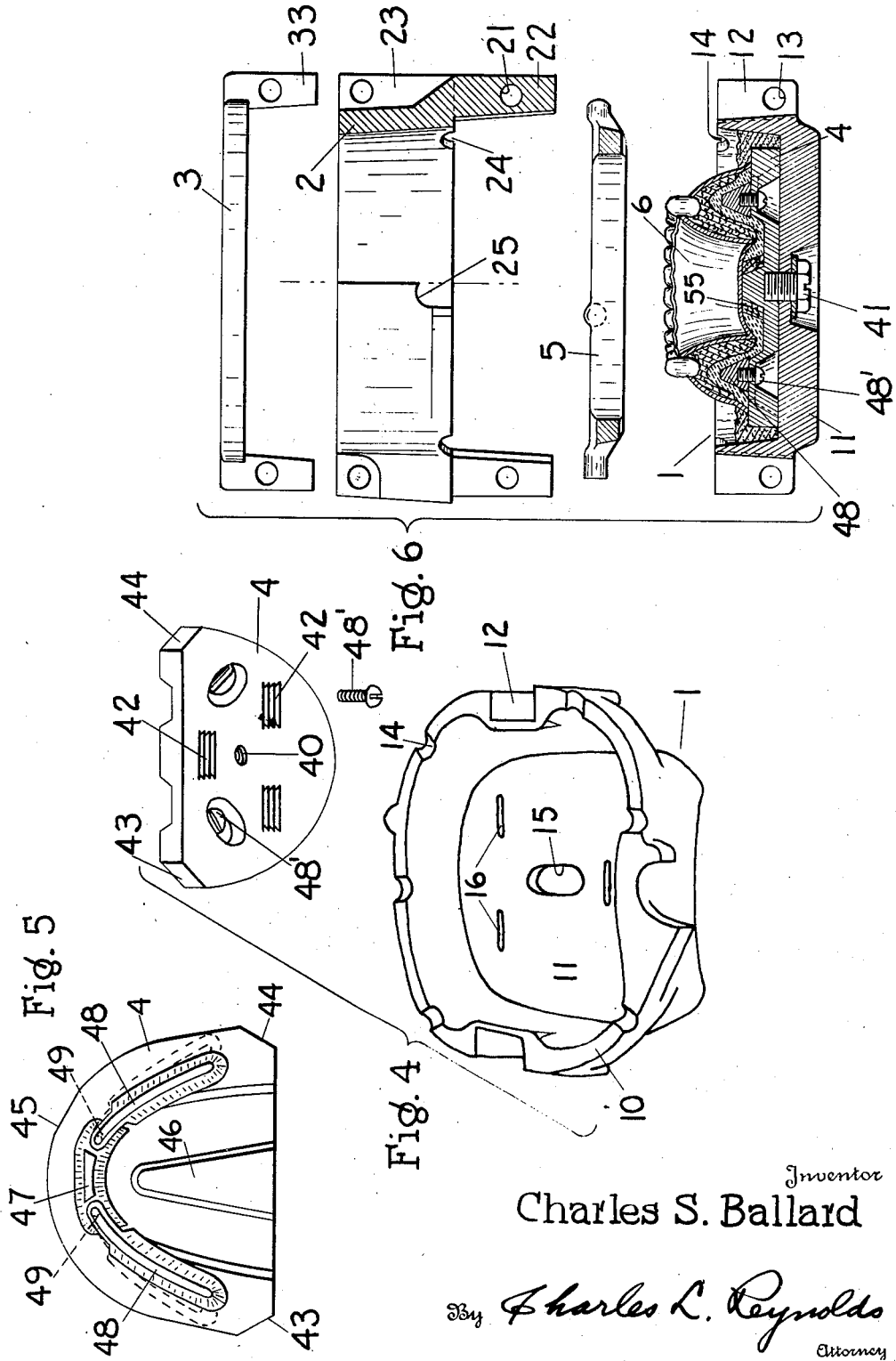
Inventor
Charles S. Ballard
By Charles L. Reynolds
Attorney Sept. 5, 1939.  C. S. BALLARD  2,171,736
ART OF MAKING DENTURES
Filed March 29, 1935  3 Sheets-Sheet 3
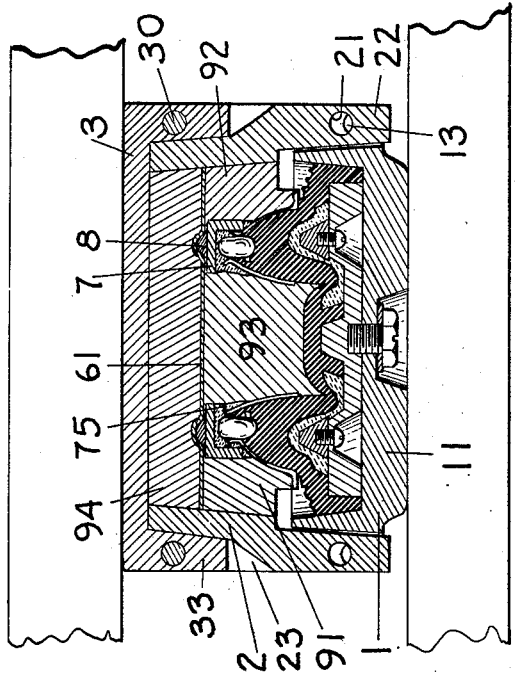
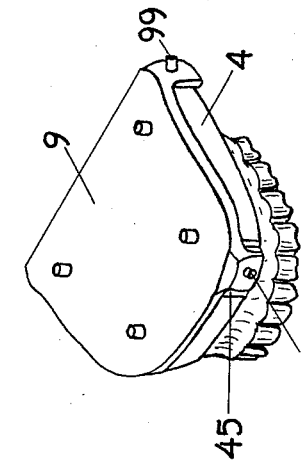
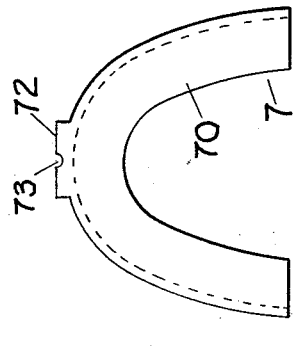
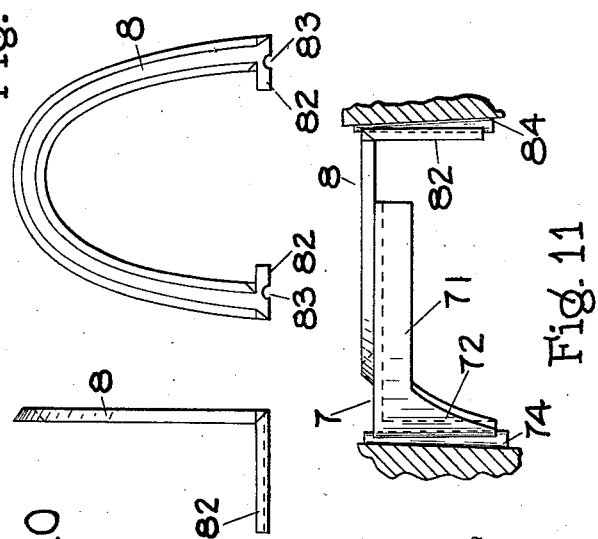
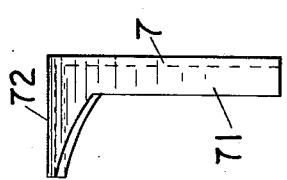
Inventor
Charles S. Ballard
By Charles L. Reynolds
Attorney Patented Sept. 5, 1939

2,171,736

UNITED STATES PATENT OFFICE 2,171,736

ART OF MAKING DENTURES

Charles S. Ballard, Seattle, Wash.

Application March 29, 1935, Serial No. 13,730

8 Claims. (Cl. 18—55.1)

My invention relates to the manufacture of artificial dentures, and is particularly intended for use in the manufacture of dentures which require the employment of heat only or heat and pressure to form and cure the dentures, the dentures in such cases being made of synthetic resins, vulcanite, cellulose base, or similar substances.

In the manufacture of such dentures, particularly those made of vinyl resins, it has been found that the stresses developed during the curing, because of unequal or insufficient application of heat in different parts of the denture, render the denture fragile, and may cause it to split or crack, particularly in the anterior portion of the vault of a full upper denture. It is therefore the general object of my invention to produce dentures which are not subject to such defects, actual or potential, and in general to provide a method and apparatus for making dentures whereby heat in particular, and also pressure when required by the particular denture-forming material, can be communicated evenly to all portions of the denture, and the denture, when completed, will be without such potentially destructive internal stresses, and will therefore be strong.

I have discovered that these general objects can best be accomplished by forming a metallic mold for the denture, and it is therefore a further object of the invention to provide a method and apparatus facilitating the formation of a metallic mold, without disturbance of the relationship of the teeth relative to each other and relative to the mold or model, and which can be readily separated without likelihood of damage to the completed denture, and a mold in which are employed a minimum of plaster or like materials having inferior heat-transmitting properties.

It is essential for best results that the proper relationship be maintained between the maxilla and the mandible, upon one or the other of which, or both, the denture or dentures are to be held, and this requires checking the work in an articulator. Hence it is a further object of the invention to provide apparatus for making such dentures which will facilitate obtaining the proper relations in the articulator and the checking of these relations after the work is completed.

These and other objects, such as particularly relate to the mechanical and technical details of my apparatus and method, will be better understood as this specification progresses.

My invention comprises the novel process, and the novel apparatus, as also the novel steps and parts of the same, as shown in illustrative forms in the accompanying drawings, and as will be described in this specification and more particularly defined by the claims at the end of the latter.

In the accompanying drawings I have shown a typical form of apparatus incorporating my invention, and enabling the carrying out of my process, and have illustrated different stages of the process.

Figure 4 is a perspective view of the lower half of the flask and a model base which is incorporated therein, illustrating the relationship between these two parts.

Figure 5 is a top plan view of such a model base, for mounting a lower denture.

Figure 6 is a view partly in section on line 6—6 of Figure 1, and partly in elevation, of a model mounted in the lower flask half and substantially ready for pouring, with the remaining flask part shown in position but separated above the lower flask half.

Figure 7 is a plan view, and Figure 8 an elevation, of an element for the mounting and protection of the teeth, and Figure 9 is a plan view and Figure 10 an elevation of a cooperating part.

Figure 11 is an elevation of these two parts in operative relationship to each other and to the flask, the latter being shown sectionally.

Figure 12 is a sectional view through a completed mold, showing the partially completed operation of processing or pressing a denture, which in this instance is a full lower denture.

Figure 13 is a perspective view of the model base and denture supported in the mount plate of an articulator.

Figure 1:
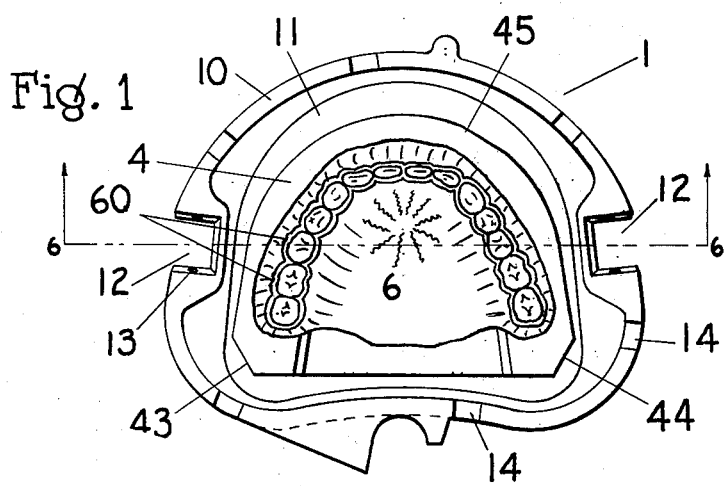
Figure 1 is a plan view of a flask half, showing a wax model of a full upper denture in place therein, and partially prepared for the pouring of metal about this model.
Figure 2:
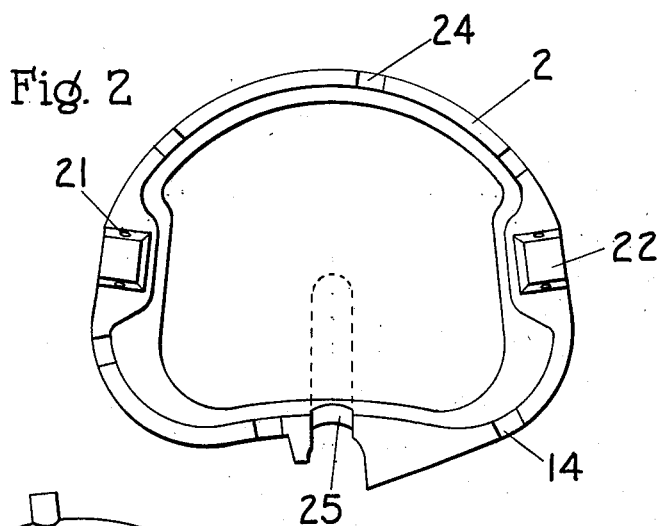
Figure 2 is a plan view of a complemental flask half, which fits on top of the half shown in Figure 1.

My invention will be best understood by following through in detail, and as a matter of illustration, the making of a denture. It is immaterial whether we choose by way of example an upper denture or a lower denture. The difference between these dentures, other than in the individual teeth, is chiefly the presence of the palatal plate in the upper denture and its absence in the lower denture. An upper denture is shown in Figure 1, while the other views showing dentures illustrate a lower denture, and the only change required to adapt the apparatus to one or the other is the employment of a metal model base, described in detail later, specifically shaped to conform either to an upper denture or to a lower one, and which is separable from the remainder of the flask, so that either may be used equally satisfactorily in the flask.

The flask which I use differs from the usual dental flask in a number of particulars. As shown, the lower half 1 has sides 10 which are shaped to facilitate pouring of metal and the separation of individual blocks of this poured metal, and a bottom 11 which is integral with the sides, and which is thick and raised, and which has a hole 15 through it. If the flask is for pressure processing, the bottom should be flush on the under side, as shown, but if intended only for heat processing, without pressure, the under side may be relieved inside its margin. In either instance it should be sufficiently thick and heavy to retain and transmit heat evenly.

Upon this lower half fits an annular upper half 2, completed by a removable cover 3, the half 2 being so shaped that easy access is afforded for the pouring of the metal about the model.

These flask parts are formed with suitable means by which they may be brought and retained in perfect registry, and secured together. This is important in order to avoid warping or distorting the model or the denture, especially when pressure is required in processing the latter. For example, the lower half 1 has notches 12, and the upper half downwardly extending tapered pins 22, which fit the notches 12 precisely when the flask halves are properly fitted together. Similarly, the upper half 2 has notches 23, and the cover the tapered pins 33. Locking pins, typified by the pins 30 in Figure 12, pass through the complementally engaged parts to lock them together. All the pins are not shown in place in Figure 12, since this illustrates the operation of pressing a denture blank which has not progressed to completion, and the holes 21 in the pins 22, and 13 in the lower half 1, have not yet come into registry. The flask parts are provided with suitable apertures, illustrated as the notches 14 and 24, for the extrusion of waste, in addition to which waste gates are formed within the mold.

In addition an opening may be formed by the notch 25 in the wall of the upper flask half for the insertion of a thermometer, although this is usually not essential.

An important part of the apparatus consists of a metal model base, of which the plate 4 is a part. This plate 4 is of a size to mount a denture, and to fit within the bottom of the lower half 1 of the flask. It is mounted in this lower half 1 in such manner that it is readily separable therefrom, and preferably it should be somewhat shiftable with relation to the sides of this flask half. It is also intended to be mounted in an articulator (not shown). It is therefore provided with securing means, such as the threaded hole 40, by means of which a screw 41 may be passed from the under side of the bottom 11 of the lower flask half through an elongated aperture 15, previously referred to, to be received in the threaded hole 40 in the plate 4. To additionally hold the plate, against rotation with relation to the bottom of the flask, I may provide any suitable means, such as a series of ridges or grooves 42 in its bottom, and cooperating ridges 16 in the bottom of the flask, whereby when the screw 41 is tightened the mount plate may not turn relatively to the flask. For the purpose of mounting the plate 4 accurately in an articulator, with respect to the mount plate 9, shown in Figure 13, I provide it with registering means, preferably located at three angularly separated points, for example the flattened surfaces 43, 44 and 45 (Figures 1, 4, and 5). These may be engaged by screws 99 in the mount plate 9 disposed normal to these several surfaces, so that by loosening one screw only, the mount plate may be put in or taken out of the articulator, and may always be reinserted therein in the same position it previously occupied. Obviously the means for securing and holding the mount plate to the flask and in the mount plate or articulator may be any which are suitable and which will accomplish the end in view.

The upper surface of the model base is formed to accommodate approximately the inside surfaces of any denture to be formed. The closer the metal of the model base approaches the surface of the denture the better, as the use of plaster should be kept to a minimum, yet allowances must be made for differences in individual dentures. The model base shown in Figures 4 and 5 is for a lower denture, and therefore is formed with an axial ridge 46, but if the model base is for an upper denture, this ridge would be omitted. Since the dental arches in the mouths of different individuals will vary in width and shape, I secure upon the upper surface of the plate 4 a ridge-forming device which is adjustable, and which may incorporate separable devices so that others of different size, shape, or curvature may be substituted for them. Thus an anterior ridge portion 47 may be formed as an integral part of the plate, upraised above its upper surface, and at each side of this are mounted lateral ridge members 48, each having a pin 49 engaging in a hole in the portion 48 so that the lateral members 48 may pivot and swing outward or inward over the upper surface of the plate 4 to accommodate different widths of jaw, or they may be separated and substitute ridge members may be employed. The plate 4, with the ridge elements 47 and 48, together constitute a metal model base.

In preparing a denture these adjustable ridge portions 48 are first adjusted to fit as closely as possible the impression of the ridge portion of the mouth, this impression having been taken by the dentist in some plastic material as, for example, plaster or compound. To hold the ridge portions 48 in their adjusted positions, screws 48′ passing through arcuate holes provided in the plate 4 may be screwed down to clamp the ridge portions 48 in their adjusted positions.

The next step is to pour a small amount of model plaster into the impression of the ridge or arch for which the denture is being made, and to place this impression, with the plaster, on the previously adjusted metal model base, consisting of the plate 4 and the ridges 48 and 47. A minimum of plaster only should be employed, owing to its poor heat-conducting qualities and liability to warp or to be distorted, and the ridge members 47 and 48 should therefore be shaped to fill as nearly as possible the ridge portions of the impression. So small an amount of plaster is used, in practice, that heat and pressure are transmitted from the flask and metal model base about as well as though no plaster were used. The metal ridge portions lie just beneath the surface of the plaster.

When the plaster becomes set, the impression material is removed from the model, and upon the model is constructed a bite plate. The bite relations are obtained from the patient's mouth by impression, and upon securing these bite relations from the patient's mouth this bite impression is placed and waxed on the model and locked to the mount plates 9 at the three points 43, 44 and 45, then the mount plate 9 is mounted on an articulator by means of plaster, using all previously secured relations between the maxilla and mandible, as shown by the bite impression.

The denture is then built in wax upon the plaster overlaying the ridge portions 47 and 48. Upon securing the proper form of the denture in wax, and having tried it in the patient's mouth and found it correct, the denture is placed back on the model and attached securely.

Figure 3:
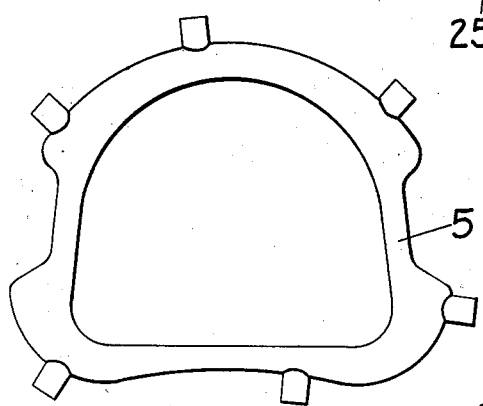
Figure 3 is a plan view of a waste gate ring which is incorporated in the flask during the step of pouring metal.

The plate 4, with the wax denture attached, is now taken from the mount plate 9, now fixed in the articular, by loosening the anterior screw 99, which engages the surface 45, the screws engaging the surfaces 43 and 44 being left unmoved. The model base is now placed in the lower half of the flask and secured with the screw 41, and in order to obtain a waste gate for the wax which is shortly to be melted out, also for any excess denture material, a waste gate ring 5 (Figure 3) may be dropped just inside the margin of the flask half 1. Any remaining space between the waste gate ring 5 and the model plate 4 may now be filled with putty or any other suitable material. This does not remain in place during the heat and pressure treatment, however.

The wax denture and all surfaces extending to the metal ring 5, both inside and outside of the teeth, are now covered with lead foil, which should be sufficiently strong and form-sustaining to withstand the weight of molten metal soon to be poured about it, and of sufficiently high melting point that its shape will not be distorted by this molten metal. The inner foil piece should be initially formed to the approximate shape of the entire vault, and may have formed therein the rugae. In order to better support the foil and to retain its relationship to the teeth it may be slit, as indicated at 60 in Figure 1, in the portion which lies adjacent the teeth, and the edges of the slit curled outward slightly. This, however, is optional, but helps to lock the foil in the plaster which later surrounds the teeth. Except for this the foil should fit the inside and outside surfaces of the teeth and all surfaces of the wax model closely, and it should be burnished down until it fits into the crevices or interproximal spaces and into all depressions of the model. The foil 6, in the case of a full upper denture illustrated in Figure 1, should extend completely across the palatal arch or vault portion and be of one piece. In the lower denture this is not necessary. The foil, however, should not extend over the occlusal surfaces of the teeth. This stage is illustrated in Figure 6.

After thoroughly foiling the model the teeth are protected and mounted in a horseshoe-shaped arch plate or plates, illustrated in Figures 7 to 11 inclusive. The horseshoe 7 of Figures 7 and 8 is formed with an occlusal flange 70 which lies in immediate contact with the occlusal surfaces of the teeth, the teeth being held to this flange by a small amount of plaster which grips the teeth firmly and holds this piece 7 in place. The plaster likewise holds the edges of the foil in place. The use of plaster here is not objectionable, notwithstanding its poor heat-conducting qualities, since it embraces only the teeth, and there is no point in later conducting heat to the teeth nor to the denture material through the teeth. The piece 7 is provided with a lateral flange 71, and with an extension 72 of a depth to fit substantially to the bottom of the lower flask half 1, this extension 72 having a groove 73 (see Figure 7). The extension 72 should be so located that, with the model base seated in the flask, it lies closely adjacent the wall 10 of the flask half, and if proper registry of the occlusal flange 70 will not permit this, the mount plate 4 may be shifted by reason of the elongated slot 15.

With the horseshoe 7 thus located, a complemental horseshoe 8 is placed on top of it, this having extensions 82, each provided with a groove 83. These extensions 82 may be located adjacent the wall of the flask opposite that wall near which is located the extension 72, and the horseshoe 8 may be held in such relation to the horseshoe 7 by a thin film of plaster between them. Here, for reasons given above, the use of plaster is not objectionable. This relationship is shown in Figure 11. Now in the grooves 73 and 83 some parting material is forced, for example a roll of foil, indicated in Figure 11 at 74 and 84. This divides the lower half of the flask into three sections, parting at the posterior ends and at the anterior portion of the dental arch.

Now the lower half of the flask, thus prepared, and with the annular upper half in place thereon, has metal poured into it up to about the level of the arch plates or horseshoes 7 and 8. Lead alloy may be employed, but its melting point should be sufficiently lower than the melting point of the foil 6 to prevent any deformation of the foil during the pouring. It should also have little or no contraction on cooling, and no expansion. This metal is indicated at 91, 92 and 93 (Figure 12); it constitutes a large mass of form-sustaining material in direct contact with the metal flask and with the denture material, and hence transmits heat uniformly and retains it without sudden changes of temperature.

Upon setting of the molten metal just poured, a thin layer of lead foil may be burnished down on its upper surface and over the horseshoe 8, to act as a parting strip. This foil is shown in Figure 12 at 61. The balance of the flask is now filled with metal at 94 above the parting strip 61, and the cover 3 may be put in place. This metal serves the same purposes as the mass 91; both are capable of transmitting heavy pressures at considerable temperatures, without deformation.

The hot metal has now melted the wax model of the denture, as also wax from the space 55 (Figure 6), which runs out upon separation of the flask halves, and any residue is eliminated with hot water, or if necessary, by the additional use of solvent.

The mold is now complete, and is composed almost exclusively of solid metal, capable of transmitting considerable pressures, and more particularly capable of transmitting heat evenly and uniformly throughout, so that no appreciable differences of temperature can exist in any part of the mold. The denture material is placed in it, usually in the form of a blank of the approximate shape of the denture. The teeth, upon the wax model melting, were left held by the plaster 75 (see Figure 12) by which they were held to the horseshoe 7, and this horseshoe was embedded in the molten metal.

The waste ring 5, putty, and other gate-forming materials having been removed, the flask is closed, as far as possible, with the denture blank in the metal mold; the cover 3 is put in place, and the case is placed in a suitable oven for processing, where it is subjected to heat and pressure. This step is illustrated in Figure 12. As the processing progresses, excess denture material will flow into the waste gates left, and the two flask halves are forced together by the pressure, until, when the processing is complete, the flask halves are together and pins may be placed through the now registering holes 21 and 13, to secure the flask halves together. It is left in this condition while the flask and contents cool.

To deflask the case, first remove the screw 41, and remove the pins 30 and similar pins holding together the two flask halves. Then pry the flask halves apart. Next jolt the upper half of the flask and its contents, as for example, by hitting the end of the guide pins 22 against the top of a bench, thereby jolting loose the metal mass, containing the processed denture, from the upper half of the flask.

Now to remove the denture from the metal mass, the top piece 94 is first pried loose, and then the sections 91, 92 and 93, which have been separated by the foil rolls 74 and 84, are removed piece by piece, carrying with them the adjoining foil, until the denture is free. This requires but little time and no appreciable effort, and because the metal is in separated sections there is no danger of injuring the denture.

The denture mold, having been made over a metal model base 4, 47, 48, and having been removed from the mount plate 9 on the articulator by loosening only one screw 99, is now replaced on the mount plate by placing the plate 4 in position and tightening the screw 99 which is engageable with the surface 45. The denture may now be checked for proper bite relations in the same manner as was the original wax model. It is then milled and finished for delivery to the patient.

The importance of the solid metal mold lies in the fact that heat is readily conducted uniformly to all parts of such a metal mold, and pressure can be exerted through this metal mold far better, more uniformly and more safely than through a plaster mold, or through a mold of any weaker material. Therefore the temperature factor during the final processing of the denture (as also the pressure factor) is uniform throughout the entire flask, and because of this uniformity, local stresses due to variations in temperature and/or pressure are not permitted to obtain. As a result the finished denture is uniformly strong, free from local stresses which may tend to crack it, and indeed, it may be subjected to treatment such as it would never be expected to withstand, without damage.

What I claim as my invention is:

1. The process of making dentures which includes the steps of encasing a denture model of wax or the like with a foil having form-sustaining characteristics when later contacted by a molten metal, pouring molten metal about such foiled model to form, when the metal sets, a separable mold consisting almost entirely of metal, wherein the teeth of the model are held in their relationship as fixed in the model, removing the model material, which has been melted by the heat of the molten metal, and applying heat to denture-forming material placed within the mold by conduction through the mold.

2. The process of making dentures which includes the steps of mounting a denture model of wax or like material meltable at low temperatures upon a metal model base, fixing the latter within a flask, encasing the model in foil having form-sustaining characteristics when later contacted by a molten metal, pouring molten metal within the flask to form, when the metal sets, a separable mold consisting almost entirely of metal, wherein the teeth are held in their previously fixed relationship, removing the model material, previously melted by the heat of the molten metal, and applying heat to denture-forming material placed within the mold by conduction through the mold and flask.

3. The process of making dentures which includes the steps of encasing a denture model, excepting the teeth, in foil which is form-sustaining when later contacted by a molten metal, securing the teeth to a metal arch plate, pouring molten metal, having a melting point lower than that of the foil, and higher than the temperatures employed in processing the denture, about such foiled model, and over the arch plate, to form, when the metal has set, a separable mold consisting almost entirely of metal, wherein the teeth are held in their previously fixed relationship, and applying heat to denture-forming material placed within such mold by conduction through the mold.

4. The process of making dentures in a metal flask incorporating a metal model base upstanding from the bottom of the lower half of the flask, which includes the steps of mounting a denture model upon the model base, encasing the same in foil, pouring molten metal having a melting point lower than that of the foil, but higher than the temperatures employed in processing the denture, about the exterior of such model, and also within the vault portion, to form a mold consisting almost entirely of metal, separable from the lower flask half and model base, removing the model material, leaving the teeth fixed to the metal mold in their previously fixed relationship, and applying heat to denture-forming material placed within such mold by conduction through the mold and flask.

5. The method of making dentures which comprises forming a model of the denture of wax or like material having a low melting point, securing to the teeth a metal support, mounting the model with a minimum of plaster or the like upon a metal plate, embracing all the exposed wax surfaces of the model with metal foil of sufficient stiffness and a sufficiently high melting point to retain its shape during the succeeding step, pouring molten metal having a melting point sufficiently high to be self-sustaining during later steps, about the model, outside the foil, and around said metal support, to melt the wax and to produce a solid metallic mold separable substantially on the plane of such support, leaving the teeth supported from such support, and supplying heat through such mold and plate and support to a blank placed therein, to complete the denture and to embed the teeth therein.

6. The process of forming dentures of synthetic resins and like thermo-plastic materials, to overcome a tendency in such materials to crack or break, due to internal stresses resulting from uneven application of heat in processing, which process comprises the steps of forming a wax model of the denture, with teeth in place, encasing surfaces of the model with foil of high melting point and having form-sustaining characteristics, when contacted by molten metal in a subsequent step, enclosing the foiled model in solid metal, of sufficient mass to transmit and maintain heat uniformly throughout, by pouring molten metal thereabout in separable masses, in a suitable flask, thereby melting the wax model and leaving the teeth supported from the metal mold thus formed, placing such denture material within the mold, and applying heat to the mold, and by conduction uniformly therethrough heating all parts of the denture material to the same temperature and during the same period, substantially uniform.

7. The process of forming a metallic mold for use in making dentures of synthetic resins or like thermo-plastic materials, which comprises the steps of encasing wax surfaces of a wax model of the denture, which has the teeth in place, with a foil, of such melting point and form-sustaining characteristics as will prevent deformation of such foil when later contacted with a molten metal, and pouring about such foiled model a molten metal of a melting point sufficiently low to prevent deformation of the foil, and sufficiently high to prevent its own deformation in the later operations upon the thermo-plastic material.

8. The process of forming a metallic mold for use in making dentures of synthetic resins or like thermo-plastic materials, which comprises the steps of mounting a wax model of the denture, which has the teeth in place, and with a minimum of non-metallic material, upon a metallic flask part, to leave the teeth projecting towards a cooperating flask part, encasing the exposed wax surfaces of the model with a foil of such melting point and form-sustaining characteristics as will prevent deformation of such foil when later contacted by a molten metal, protecting the exposed teeth with a minimum of non-metallic material, and pouring about such foiled model and the teeth, and within said cooperating flask part, a molten metal of a melting point sufficiently low to prevent deformation of the foil, and sufficiently high to prevent its own deformation in the later operations upon the thermo-plastic material.

CHARLES S. BALLARD.